(12) United States Patent
Kim et al.

(10) Patent No.: US 11,285,368 B2
(45) Date of Patent: Mar. 29, 2022

(54) ADDRESS DIRECTION GUIDING APPARATUS AND METHOD

(71) Applicant: VC INC., Seoul (KR)

(72) Inventors: Juno Kim, Anyang-si (KR); Hohyeong Lee, Seoul (KR); Choong Jin Lee, Guri-si (KR); Jeongho Park, Chuncheon-si (KR)

(73) Assignee: VC INC., Seoul (KR)

( * ) Notice: Subject to any disclaimer, the term of this patent is extended or adjusted under 35 U.S.C. 154(b) by 452 days.

(21) Appl. No.: 16/296,487

(22) Filed: Mar. 8, 2019

(65) Prior Publication Data

US 2019/0282882 A1 Sep. 19, 2019

(30) Foreign Application Priority Data

Mar. 13, 2018 (KR) .................. 10-2018-0029221
Oct. 8, 2018 (KR) .................. 10-2018-0119950

(51) Int. Cl.
*G01C 1/00* (2006.01)
*G01B 11/26* (2006.01)
*A63B 69/36* (2006.01)

(52) U.S. Cl.
CPC .......... *A63B 69/3658* (2013.01); *G01B 11/26* (2013.01); *G01C 1/00* (2013.01)

(58) Field of Classification Search
CPC ...... A63B 69/3658; G01C 1/00; G01C 21/20; G01B 11/26; G01B 5/0023; G01S 19/51; G01S 19/19
USPC .......................................................... 33/289
See application file for complete search history.

(56) References Cited

U.S. PATENT DOCUMENTS

| | | | |
|---|---|---|---|
| 9,734,688 B2* | 8/2017 | Ishii | G08B 21/0288 |
| 10,341,642 B2* | 7/2019 | Ueno | G06T 19/00 |
| 2004/0225416 A1* | 11/2004 | Kubota | B60R 16/0231 |
| | | | 701/1 |
| 2015/0192777 A1* | 7/2015 | Bae | G06F 3/013 |
| | | | 345/175 |
| 2015/0312559 A1* | 10/2015 | Ueno | G06F 3/04815 |
| | | | 348/53 |
| 2016/0005229 A1* | 1/2016 | Lee | G06F 3/0488 |
| | | | 345/419 |
| 2016/0041388 A1* | 2/2016 | Fujimaki | G02B 27/017 |
| | | | 345/2.1 |
| 2016/0358446 A1* | 12/2016 | Ishii | G08B 25/016 |
| 2016/0360366 A1* | 12/2016 | Ishii | G08B 21/0283 |
| 2018/0047194 A1* | 2/2018 | Shirai | G16H 10/20 |
| 2018/0065019 A1* | 3/2018 | Shibuya | G16H 20/30 |
| 2018/0176547 A1* | 6/2018 | Kobayashi | H04N 13/332 |
| 2018/0272210 A1* | 9/2018 | Shibuya | G06K 9/00536 |
| 2018/0300728 A1* | 10/2018 | Shibuya | A61B 5/6895 |

(Continued)

FOREIGN PATENT DOCUMENTS

KR 10-2016-0109251 9/2016
KR 10-2017-0035126 3/2017

(Continued)

*Primary Examiner* — Yaritza Guadalupe-McCall
(74) *Attorney, Agent, or Firm* — Lex IP Meister, PLLC (57) ABSTRACT

An address direction guiding apparatus includes: an azimuth sensor configured to measure an azimuth; a light output unit configured to output light; and a control unit configured to control the light output unit to output light differently depending on an angle between a target azimuth and the azimuth measured by the azimuth sensor.

14 Claims, 10 Drawing Sheets

(56) References Cited

U.S. PATENT DOCUMENTS

| | | | |
|---|---|---|---|
| 2019/0053009 A1* | 2/2019 | Tanabe | H04W 4/027 |
| 2019/0088113 A1* | 3/2019 | Tanabe | G08B 21/02 |
| 2019/0208141 A1* | 7/2019 | Oyama | G06T 7/70 |
| 2019/0208142 A1* | 7/2019 | Kitaya | H04N 5/2628 |
| 2019/0227642 A1* | 7/2019 | Nishizawa | G06F 3/041 |
| 2019/0262690 A1* | 8/2019 | Kim | A63B 24/0003 |
| 2019/0282882 A1* | 9/2019 | Kim | A63B 69/3658 |
| 2019/0285896 A1* | 9/2019 | Kobayashi | G02B 27/0172 |
| 2019/0349521 A1* | 11/2019 | Manabe | H04N 5/23229 |
| 2020/0124738 A1* | 4/2020 | Kim | G01S 7/51 |
| 2020/0143774 A1* | 5/2020 | Kohara | G09G 5/36 |
| 2020/0158873 A1* | 5/2020 | Kim | G01S 17/88 |
| 2020/0282287 A1* | 9/2020 | Kim | G01C 15/002 |
| 2020/0284905 A1* | 9/2020 | Kim | G01S 19/19 |
| 2020/0363190 A1* | 11/2020 | Lee | A63B 71/0622 |
| 2020/0400954 A1* | 12/2020 | Tanaka | G06F 3/012 |
| 2021/0160150 A1* | 5/2021 | Taki | G06F 3/0484 |

FOREIGN PATENT DOCUMENTS

| | | |
|---|---|---|
| KR | 10-2017-0047665 | 5/2017 |
| KR | 10-1746662 | 6/2017 |
| WO | 2018-043975 | 3/2018 |

\* cited by examiner

ADDRESS DIRECTION GUIDING APPARATUS AND METHOD

CROSS-REFERENCE TO RELATED APPLICATION

This application claims priority to and the benefit of Korean Patent Application No. 10-2018-0029221 and 10-2018-0119950 filed in the Korean Intellectual Property Office on Mar. 13, 2018 and Oct. 8, 2018, the entire contents of which are incorporated herein by reference.

BACKGROUND OF THE INVENTION

(a) Field of the Invention

The present disclosure relates to an address direction guiding apparatus and method.

(b) Description of the Related Art

Golf is a sport in which golfers hit golf balls into a series of holes. A golfer decides a target point by considering the current position of a golf ball and the position of a hole, and selects a suitable golf club to hit the golf ball toward the target point.

At this time, although the target point was properly decided, the golf ball may not be moved to the target point in the case when the golfer does not address the golf ball in the correct direction. Such a problem is generally caused by a visual error which occurs as the golfer stands on his side and guesses the direction to the target point. Since golf is a sport in which a golfer hits a golf ball to a point at a long distance of several tens of meters or more, a minute direction error which cannot be recognized by the golfer (for example, an angle of 1 to 5 degrees) may cause a distance difference of several meters to several tens of meters from the target point.

Even during putting on or around a green, a golf ball is deviated from the hole cup in many cases, due to a minute direction error which is caused when the golfer does not address the golf ball in the correct direction.

When a golfer can check whether the golfer correctly addresses a golf ball in a direction intended by the golfer, the golfer can play golf with further confidence, and thus improve the athletic performance.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention provides an address direction guiding apparatus and method capable of solving the above-described problems and other problems. Another embodiment of the present invention provides an address direction guiding apparatus and method which can guide a proper address direction to a user.

Yet another embodiment of the present invention provides an address direction guiding apparatus and method which can intuitionally display an address direction.

Still another embodiment of the present invention provides an address direction guiding apparatus and method which can be conveniently carried or easily mounted on a cap, glasses or the like.

According to an exemplary embodiment of the present invention, an address direction guiding apparatus may include: an azimuth sensor configured to measure an azimuth; a light output unit configured to output light; and a control unit configured to control the light output unit to output light differently depending on an angle between a target azimuth and the azimuth measured by the azimuth sensor.

The light output unit may include a plurality of light emitting units configured to emit different colors of light, and the control unit may control the light output unit such that at least one of the plurality of light emitting units emits light to display different colors of light depending on the angle.

The light output unit may include one light emitting unit configured to emit different colors of light, and the control unit may control the light output unit such that the light emitting unit emits light to display different colors of light depending on the angle.

The light output unit may include one light emitting unit configured to emit one color of light, and the control unit may control the light output unit such that the light emitting unit emits light in different light emission cycles depending on the angle.

The address direction guiding apparatus may further include a vibration output unit, in which the control unit controls the vibration output unit to vibrate in different vibration cycles depending on the angle.

The address direction guiding apparatus may further include: a memory configured to store map information of golf courses, and a position acquisition sensor configured to acquire a current position, in which the control unit reads map information of a golf course corresponding to the current position from the memory, acquires the coordinate of a predetermined target using the map information, and calculates the target azimuth using the coordinate of the current position and the coordinate of the target.

The address direction guiding apparatus may further include a user input unit, in which the control unit sets an azimuth to the target azimuth, the azimuth being measured by the azimuth sensor when the user input unit receives a user input.

The address direction guiding apparatus may further include a short-range communication module, in which the control unit receives information on the target azimuth from another device connected through the short-range communication module.

According to an exemplary embodiment of the present invention, an address direction guiding method may include: acquiring a target azimuth; measuring, by an azimuth sensor, a current azimuth, and controlling, by a control unit, a light output unit to output light differently depending on an angle between the target azimuth and the azimuth measured by the azimuth sensor.

The controlling of the light output unit to output light differently may include controlling, by the control unit, the light output unit such that at least one of a plurality of light emitting units to emit different colors of light emits light to display different colors of light depending on the angle.

The controlling of the light output unit to output light differently may include controlling, by the control unit, the light output unit such that one light emitting unit to emit different colors of light emits light to display different colors of light depending on the angle.

The controlling of the light output unit to output light differently may include controlling, by the control unit, the light output unit such that one light emitting unit to emit one color of light emits light in different light emission cycles depending on the angle.

The address direction guiding method may further include controlling, by the control unit, a vibration output unit to vibrate in different vibration cycles depending on the angle.

The acquiring of the target azimuth may include: acquiring, by a position acquisition sensor, a current position; reading, by the control unit, map information of a golf course corresponding to the current position from a memory storing map information of golf courses; acquiring, by the control unit, the coordinate of a predetermined target using the map information; and calculating, by the control unit, the target azimuth using the coordinate of the current position and the coordinate of the target.

The acquiring of the target azimuth may include: receiving, by a user input unit, a user input; controlling, by the control unit, the azimuth sensor to measure an azimuth when the user input is received; and setting, by the control unit, an azimuth to the target azimuth, the azimuth being measured when the user input is received.

The acquiring of the target azimuth may include receiving, by the control unit, information on the target azimuth from another device connected through a short-range communication module.

According to another exemplary embodiment of the present invention, an address direction guiding apparatus may include: a case forming the exterior of the address direction guiding apparatus; a coupling unit disposed on the case; an azimuth sensor configured to measure an azimuth; and a light output unit exposed from the case, and configured to output light differently, when the azimuth measured by the azimuth sensor is changed.

The effects of the address direction guiding apparatus and method according to the present disclosure will be described as follows.

According to one or more of the exemplary embodiments of the present disclosure, a golfer can easily check an address direction.

According to one or more of the exemplary embodiments of the present disclosure, a golfer can conveniently correct an address direction.

An addition range to which the present disclosure can be applied will be clarified from the following detailed descriptions. However, since various modifications and corrections within the range of the present disclosure can be clearly understood by those skilled in the art, it should be understood that the detailed descriptions and specific embodiments such as preferred embodiments of the present disclosure are simply given as examples.

DETAILED DESCRIPTION OF THE EMBODIMENTS

Hereinafter, exemplary embodiments disclosed in this specification will be described in detail with reference to the accompanying drawings. The same or similar components will be represented by the same or like reference numerals, and the detailed descriptions thereof will be omitted herein. Suffixes such as "module" and "unit" used for constituent elements in the following descriptions are given or used together in consideration of only convenience for specification writing, and have no meanings or roles to distinguish from each other. Moreover, when exemplary embodiments disclosed in this specification are described, detailed descriptions related to publicly known functions or configurations will be ruled out in order not to unnecessarily obscure subject matters of the exemplary embodiments disclosed in this specification. Furthermore, it should be understood that the accompanying drawings are only used to promote understandings of the exemplary embodiments disclosed in this specification, do not limit the technical idea of this specification, and include all modifications, equivalents and substitutes included in the spirit and scope of the present invention.

Terms including an ordinal number such as first or second may be used for describing various constituent elements, but the constituent elements are not limited by the terms. The terms are only used to distinguish one constituent element from another constituent element.

When a constituent element is referred to as being "coupled" or "connected" to another constituent element, it may not only indicate that the former constituent element is directly coupled or connected to the latter constituent element, but also indicate that still another constituent element is present therebetween. On the other hand, when a constituent element is "directly coupled" or "directly connected" to another constituent element, it may indicate that there is no constituent element therebetween.

In this specification, the term of "include" or "have" specifies a property, number, step, operation, constituent element, part or combinations thereof, but does not exclude one or more other properties, numbers, steps, operations, constituent elements, parts or combinations thereof.

Figure 1:
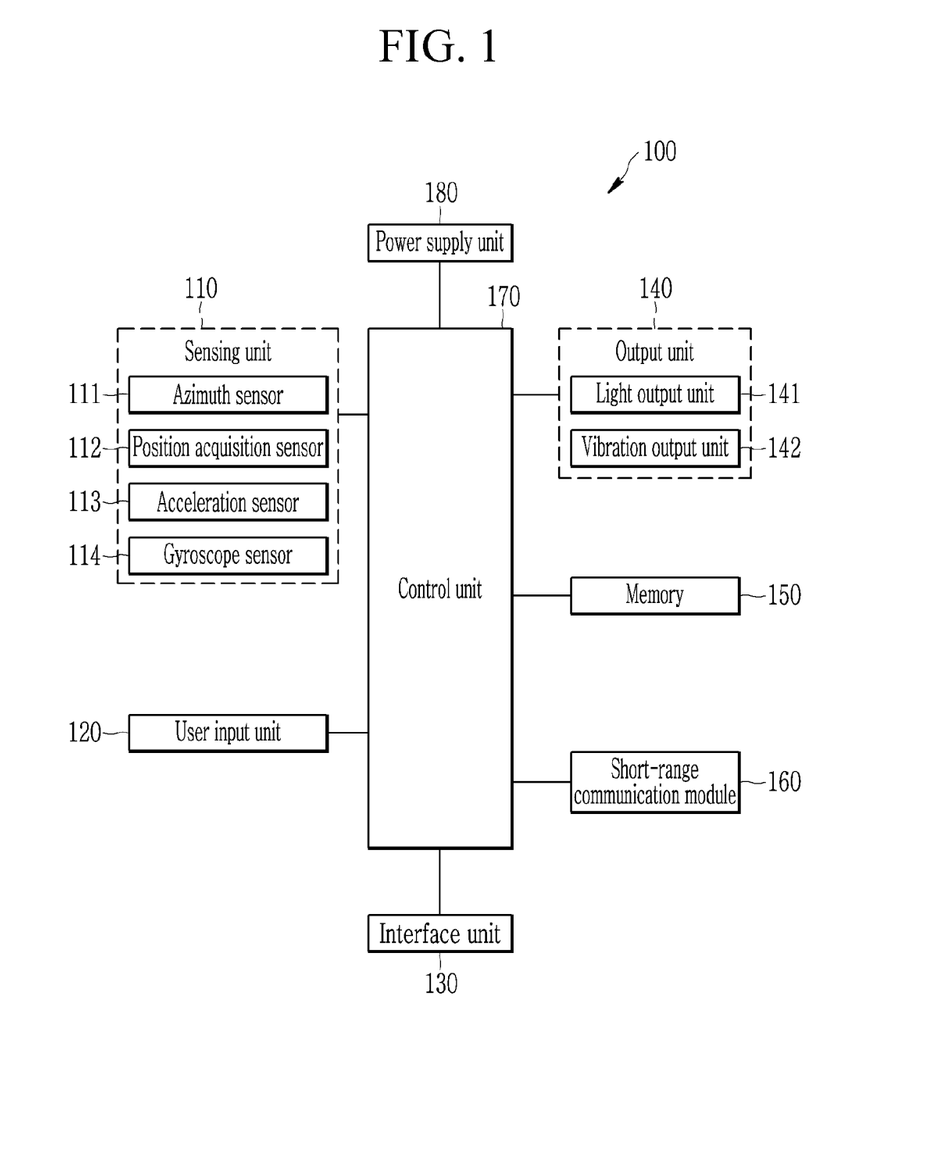
FIG. 1 is a block diagram for describing an address direction guiding apparatus according to an exemplary embodiment.

FIG. 1 is a block diagram for describing an address direction guiding apparatus according to an exemplary embodiment.

An address direction guiding apparatus 100 may include a sensing unit 110, a user input unit 120, an interface unit 130, an output unit 140, a memory 150, a short-range communication module 160, a control unit 170, a power supply unit 180 and the like. The constituent elements illustrated in FIG. 1 are not necessarily required for implementing the address direction guiding apparatus 100. Therefore, the address direction guiding apparatus 100 described in this specification may have a larger or smaller number of constituent elements than the constituent elements listed above.

More specifically, the sensing unit 110 among the constituent elements may include one or more sensors for sensing one or more pieces of information between surrounding environment information of the address direction guiding apparatus 100 and information within the address direction guiding apparatus 100. For example, the sensing unit 110 may include one or more of an azimuth sensor 111, a position acquisition sensor 112, an acceleration sensor 113, a gyroscope sensor 114, a battery gauge and an environment sensor (e.g., a barometer, hygrometer, thermometer or the like). The address direction guiding apparatus 100 disclosed in this specification may combine and utilize information sensed by two or more sensors of such sensors.

First, the azimuth sensor 111 for measuring an azimuth may acquire the value of an azimuth that the address direction guiding apparatus 100 faces. The azimuth sensor 111 may be a geomagnetic sensor to measure an azimuth by sensing the earth's magnetic field. Moreover, the azimuth sensor 111 may be configured to calculate an azimuth using a rotational angle in the left-right direction from a predetermined reference direction acquired by the gyroscope sensor 114.

The position acquisition sensor 112 serves to acquire a position of the address direction guiding apparatus 100. Representative example of the position acquisition sensor 112 may include a GPS (Global Positioning System) sensor. The GPS sensor may calculate distance information from three or more satellites and correct time information, and then apply trigonometry to the calculated information, thereby accurately calculating three-dimensional current position information depending on the latitude, longitude and altitude. Currently, a method is widely used, which calculates position and time information using three satellites, and corrects an error of the calculated position and time information using another satellite. Moreover, the GPS sensor can calculate speed information by continuously calculating the current position in real time.

The acceleration sensor 113 may acquire a tilt of the address direction guiding apparatus 100. The acceleration sensor 113 may include an accelerometer to measure the gravity acceleration. Furthermore, the acceleration sensor 113 may be configured to calculate a tilt using a rotational angle in the top-to-bottom direction from the predetermined reference direction acquired by the gyroscope sensor. When an angle is sensed by the gyroscope sensor, the acceleration sensor 113 estimates a tilt by increasing/decreasing an integration error.

The gyroscope sensor 114 may acquire a rotation amount by sensing rotation of the address direction guiding apparatus 100. The acceleration sensor 113 may express the sensed acceleration as a vector value for three axes (X-axis, Y-axis and Z-axis), and the gyroscope sensor may express the sensed acceleration as a rotation vector value (roll, pitch and yaw) for three axes.

The acceleration sensor 113 and the gyroscope sensor 114 may be integrated into a posture sensor. The posture sensor may sense the speed and position and a position change of the address direction guiding apparatus 100. The posture sensor may be a typical inertial navigation system (INS), and the gyroscope sensor may be an optical, mechanical or piezoelectric gyroscope sensor.

The user input unit 120 may serve to receive information from a user. When information is inputted through the user input unit 120, the control unit 170 may control an operation of the address direction guiding apparatus 100 in response to the input information. Such a user input unit 120 may include a mechanical input unit and a touch input unit. The mechanical input unit may include a mechanical key, for example, a button, dome switch, jog wheel or jog switch positioned on the front, rear or side surface of the address direction guiding apparatus 100. For example, the touch input unit may be composed of virtual keys, soft keys or visual keys displayed on a touch screen through software processing, or composed of touch keys disposed at a position other than the touch screen. The virtual keys or visual keys can be displayed in various shapes on the touch screen. For example, the virtual keys or visual keys may be implemented as graphic, text, icon, video or combinations thereof.

The interface unit 130 may serve as a path with various types of external devices connected to the address direction guiding apparatus 100. Such an interface unit 130 may include one or more of an external charger port, a wired/wireless data port and a memory card port. When an external device is connected to the interface unit 130, the address direction guiding apparatus 100 may perform proper control related to the connected external device.

The output unit 140 may serve to generate an output related to a sense of sight, hearing or touch, and include a light output unit 141, a sound output unit 142, a vibration output unit, a display unit and the like.

The light output unit 141 guides an address direction using light of a light source. A signal outputted by the light output unit 141 is implemented as the address direction guiding apparatus 100 emits one or more colors of light on the front or rear surface thereof. The signal output may end when the address direction guiding apparatus 100 senses a user's shot. For example, when the posture of the address direction guiding apparatus 100, sensed by the acceleration sensor 113 and the gyroscope sensor 114, is suddenly changed, the control unit 170 may determine that the user completed a shot, and end the signal output. At this time, the control unit 170 may determine whether the user changes the direction or moves, by further using sensing data of the azimuth sensor 111 and the position acquisition sensor 112, in order to determine whether the user completed the shot.

The light output unit 141 also outputs a signal for notifying an event of the address direction guiding apparatus 100. Examples of the event which occurs in the address direction guiding apparatus 100 may include a connection of an external device, battery alarm, information reception through an application and the like.

The sound output unit 142 may output audio data stored in the memory 150 as sound, and may be implemented as a loud speaker to output various alarm sounds or multimedia playback sounds.

The vibration output unit 143 generates various tactile effects that a user can feel. The intensity and pattern of vibration generated by the vibration output unit 143 may be controlled by a selection of the user or setting of the control unit 170. For example, the vibration output unit 143 may synthesize and output different vibrations or sequentially output different vibrations.

The display unit may include one or more of a liquid crystal display (LCD), thin film transistor-liquid crystal display (TFT LCD), organic light-emitting diode (OLED) and e-ink display.

The memory 150 stores data for supporting various functions of the address direction guiding apparatus 100. For example, the data may include course map information on tee boxes, fairways, hazards, bunkers, roughs, greens and holes of a golf course, and are not limited thereto. The memory 150 may store firmware and application programs, which are driven by the address direction guiding apparatus 100, and data and commands, which are applied for the operation of the address direction guiding apparatus 100. At least a part of such application programs may be present on the address direction guiding apparatus 100 at the time of release, for the basic functions of the address direction guiding apparatus 100. Moreover, at least a part of the application programs may be downloaded from an external server through wireless communication. The application programs may be stored in the memory 150, installed on the address direction guiding apparatus 100, and driven to perform an operation or function of the address direction guiding apparatus 100 under control of the control unit 170.

The short-range communication module 160 may support short-range communication using one or more of Bluetooth, RFID (Radio Frequency Identification), IrDA (Infrared Data Association), UWB (Ultra Wideband), ZigBee, NFC (Near Field Communication), Wi-Fi (Wireless-Fidelity), Wi-Fi Direct and Wireless USB (Wireless Universal Serial Bus). The short-range communication module 160 may support wireless communication between the address direction guiding apparatus 100 and a wireless communication system, between the address direction guiding apparatus 100 and a wireless communication device, or between the address direction guiding apparatus 100 and the network in which an external server is positioned, through wireless area networks. The wireless area networks may be wireless personal area networks.

Here, the wireless communication device may be a mobile terminal which can exchange data or interwork with the address direction guiding apparatus 100 according to the present exemplary embodiment. Examples of the mobile terminal may include a smart phone, table PC, notebook and the like. The short-range communication module 160 may sense or recognize a wireless communication device which is positioned around the address direction guiding apparatus 100 and can communicate with the address direction guiding apparatus 100. Furthermore, when the sensed wireless communication device is a device which is authenticated to communicate with the address direction guiding apparatus 100 according to the exemplary embodiment, the control unit 170 may transmit at least a part of data processed by the address direction guiding apparatus 100 to the wireless communication device through the short-range communication module 160. Therefore, a user of the wireless communication device may use the data processed by the address direction guiding apparatus 100 through the wireless communication device. Moreover, the control unit 170 may receive at least a part of the data processed by the wireless communication device through the short-range communication module 160. Therefore, the user of the address direction guiding apparatus 100 may use the data processed by the wireless communication device through the address direction guiding apparatus 100.

The control unit 170 controls overall operations of the address direction guiding apparatus 100, in addition to the operation related to the application programs. The control unit 170 may process signals, data, information or the like inputted or outputted through the above-described constituent components or drive the application programs stored in the memory 150, thereby providing and processing information or functions suitable for the user.

The control unit 170 may control at least a part of the constituent components described with reference to FIG. 1, in order to drive the application programs stored in the memory 150. Furthermore, the control unit 170 may combine and operate two or more of the constituent components included in the address direction guiding apparatus 100, in order to drive the application programs.

The power supply unit 180 receives external power or internal power and supplies the power to the respective constituent components included in the address direction guiding apparatus 100, under control of the control unit 170. The power supply unit 180 may include a battery, and the battery may be an embedded battery or replaceable battery.

At least some of the constituent components may operate in cooperation with each other, in order to implement operations, control or control methods of address direction guiding apparatuses 100 according to various exemplary embodiments, which will be described below. The operation, control or control method of each of the address direction guiding apparatuses 100 may be implemented in the address direction guiding apparatus 100 by driving one or more application programs stored in the memory 150.

Figure 2:
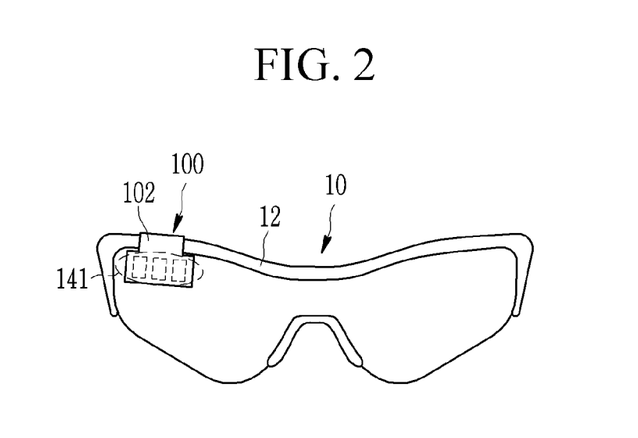
FIGS. 2 and 3 are conceptual diagrams illustrating examples in which the address direction guiding apparatus according to the exemplary embodiment is mounted.
Figure 3:
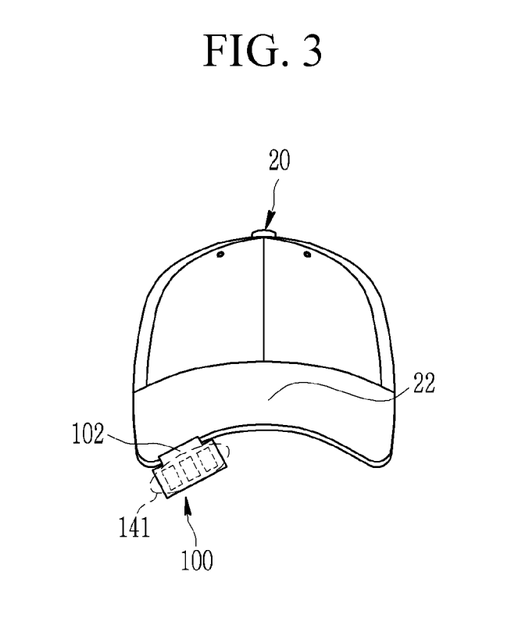

FIGS. 2 and 3 are conceptual diagrams illustrating examples in which the address direction guiding apparatus according to the exemplary embodiment is mounted.

As illustrated in FIG. 2, the address direction guiding apparatus 100 may be mounted on a frame 12 of sunglasses 10 or the like. The address direction guiding apparatus 100 includes a case constituting the exterior (for example, a frame, housing, cover or the like). The light output unit 141 is exposed to the case.

A coupling unit 102 may be positioned on the case. The coupling unit 102 may be fastened to the frame 12 of the sunglasses 10. At this time, the light output unit 141 may be disposed toward the sunglasses 10. Thus, a user can recognize light outputted by the light output unit 141, when wearing the sunglasses 10.

As illustrated in FIG. 3, the address direction guiding apparatus 100 may be mounted on a visor 22 of a cap 20 or the like. The coupling unit 102 may be fastened to the visor 22. At this time, the light output unit 141 may be disposed toward a user wearing the cap 20. Thus, the user can recognize light outputted by the light output unit 141 when wearing the cap 20.

Hereinafter, exemplary embodiments related to a control method which can be implemented in the address direction guiding apparatus 100 having the above-described configuration will be described with reference to the accompanying drawings. It is obvious to those skilled in the art that the present invention can be embodied in specific forms without departing from the spirit and essential characteristics of the present invention.

Referring to FIGS. 4 to 13, a control method of the address direction guiding apparatus 100 according to a first exemplary embodiment will be described.

Figure 4:
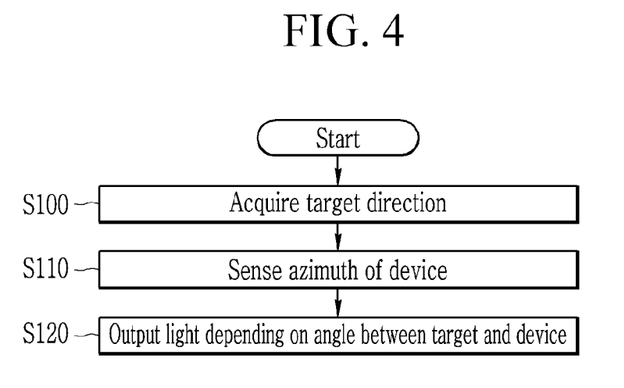
FIG. 4 is a flowchart illustrating an address direction guiding method according to an exemplary embodiment.
Figure 5:
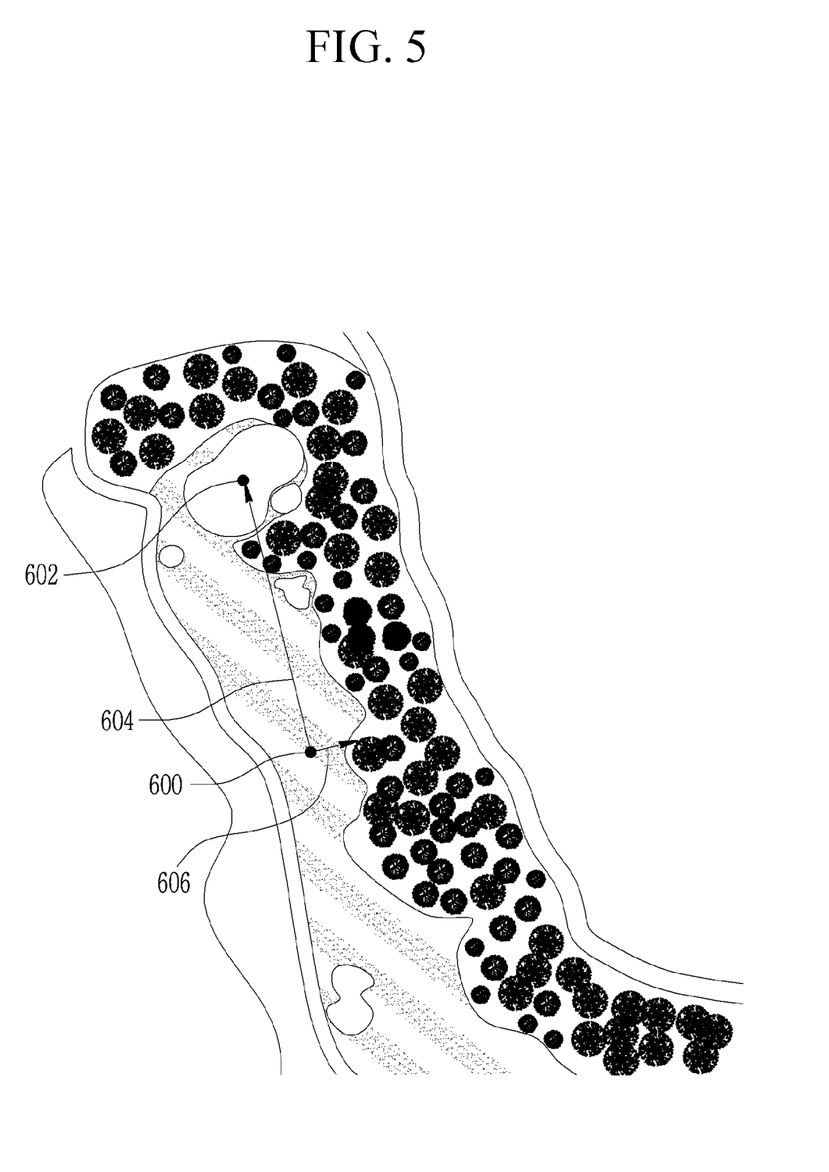
FIG. 5 is a diagram illustrating a current point, target and address direction.
Figure 6:
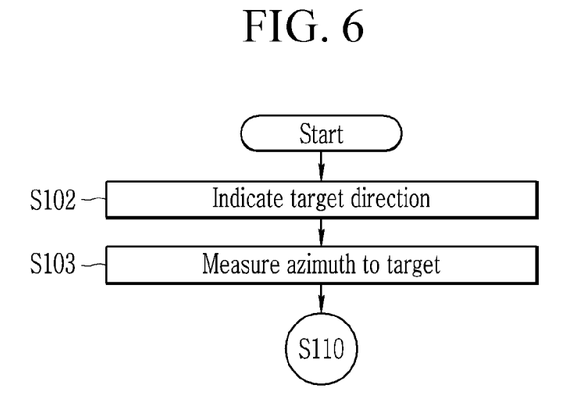
FIGS. 6 and 7 are flowcharts illustrating a method for acquiring the direction to a target according to the address direction guiding method of FIG. 4.
Figure 7:
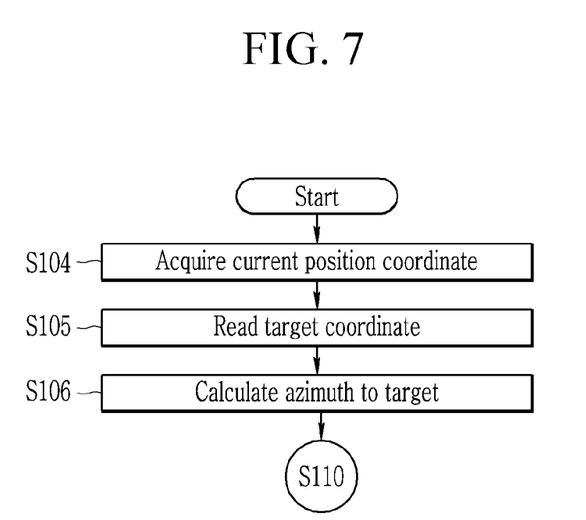

FIG. 4 is a flowchart illustrating an address direction guiding method according to an exemplary embodiment, FIG. 5 is a diagram illustrating a current point, a target and an address direction, and FIGS. 6 and 7 are flowcharts illustrating a method for acquiring the direction to the target according to the address direction guiding method of FIG. 4.

Referring to FIG. 4, the azimuth sensor 111 acquires the azimuth of the direction that the address direction guiding apparatus 100 faces, as a target direction (S100). As illustrated in FIG. 5, the azimuth sensor 111 may acquire a direction 604 from a current position 600 to a target 602.

As illustrated in FIG. 6 in this connection, when the address direction guiding apparatus 100 indicates the target 602 (S102) (for example, a user wears the sunglasses 10 or the cap 20 having the address direction guiding apparatus 100 attached thereto and stands facing the target 602) and the user inputs a command for setting the target direction through the user input unit 120, the azimuth sensor 111 may measure the azimuth in this state (S103), and acquire the measured azimuth as the target direction. The target direction may indicate a relative direction measured by the user. For example, the azimuth measured by the azimuth sensor 111 may indicate an azimuth which measured while the user stands facing the target 602. Strictly speaking, the azimuth may not indicate the azimuth from the current position 600 to the target 602.

Furthermore, as illustrated in FIG. 7, the position acquisition sensor 112 acquires the current position (S104), and the control unit 170 reads course map information corresponding to the coordinate of the current position from the memory 150, and acquires the coordinate of a predetermined target (S106). The predetermined target includes a hole, a green center point, an intersection point (I.P) and the like, but is not limited thereto. The control unit 170 may calculate the azimuth using the coordinate of the current position acquired by the position acquisition sensor 112 and the coordinate of the target (S106), and acquire the calculated azimuth as the target direction.

Then, the azimuth sensor 111 senses the azimuth of the direction that the address direction guiding apparatus 100 faces (S110). When the acquiring of the target direction is completed (S100), the azimuth sensor 111 may continuously measure the azimuth of the direction that the address direction guiding apparatus 100 faces, from the current position.

Then, the control unit 170 controls a light output of the light output unit 141 according to an angle between the target direction and the direction that the address direction guiding apparatus 100 faces (S120).

FIG. 5 illustrates the target direction 602 and a direction 606 that the address direction guiding apparatus 100 faces. When the angle between the two directions is 90 degrees, it is easy for a golf ball to move to the target 602. Therefore, the control unit 170 controls the light output unit 140 to change the color of output light, depending on a range to which the angle between the two directions belongs.

This operation will be described with reference to FIGS. 8 to 13.

FIGS. 8 to 13 are diagrams illustrating examples in which the light output unit of the address direction guiding apparatus guides an address direction according to aspects of the exemplary embodiment.

Figure 8:
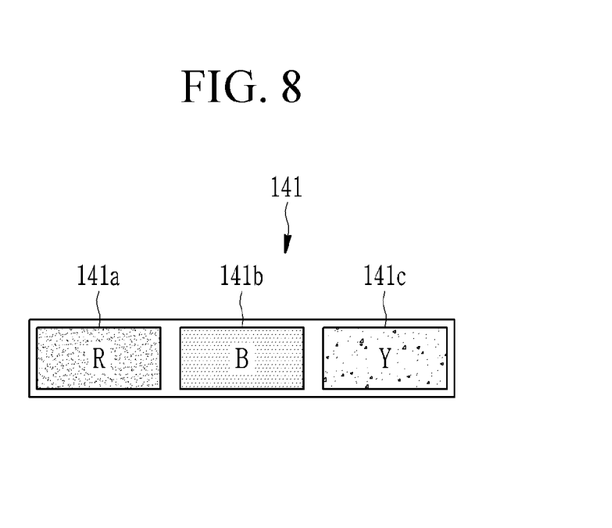
FIGS. 8 and 9 are diagrams illustrating an example in which a light output unit of the address direction guiding apparatus guides an address direction according to an aspect of the exemplary embodiment.
Figure 9:
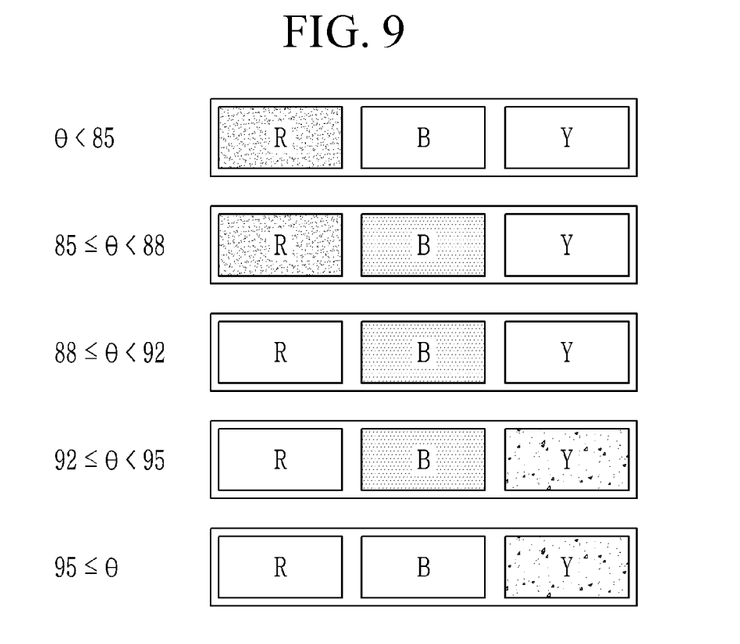

As illustrated in FIG. 8, the light output unit 141 includes light emitting units 141a, 141b and 141c which emit three different colors R, B and Y of light. In this case, as illustrated in FIG. 9, the control unit 170 may control only the light emitting unit 141a to light emit when the angle between the two directions is less than 85 degrees, control the light emitting units 141a and 141b to emit light when the angle is equal to or more than 85 degrees and less than 88 degrees, control the light emitting unit 141b to emit light when the angle is equal to or more than 88 degrees and less than 92 degrees, control the light emitting units 141b and 141c to emit light when the angle is equal to or more than 92 degrees and less than 95 degrees, and control only the light emitting unit 141c to emit light when the angle is equal to or more than 95 degrees.

Figure 10:
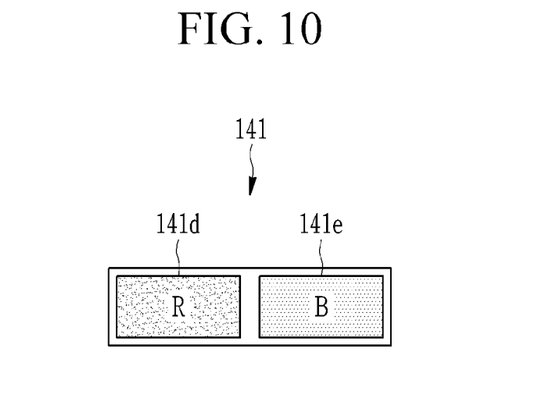
FIGS. 10 and 11 are diagrams illustrating an example in which the light output unit of the address direction guiding apparatus guides an address direction according to another aspect of the exemplary embodiment.
Figure 11:
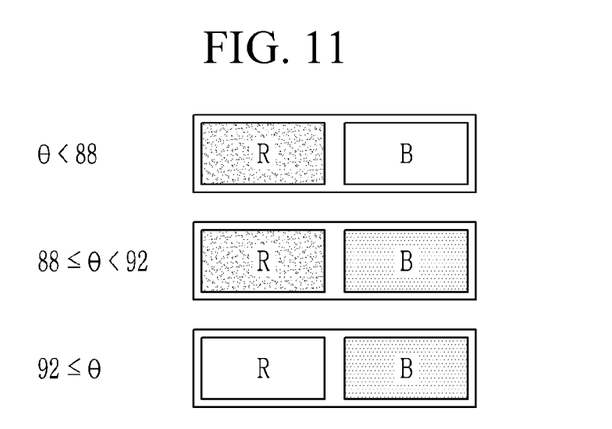

As illustrated in FIG. 10, the light output unit 141 may include light emitting units 141d and 141e which emit two different colors R and B of light. In this case, as illustrated in FIG. 11, the control unit 170 may control only the light emitting unit 141d to emit light when the angle between the two directions is less than 88 degrees, control both of the light emitting units 141d and 141e to emit light when the angle is equal to or more than 88 degrees and less than 92 degrees, and control only the light emitting unit 141e to emit light when the angle is equal to or more than 92 degrees.

That is, the light output unit 141 described with reference to FIGS. 8 to 11 may display the alignment information by combining the various colors of light emitting units depending on an alignment angle of a user, using the various colors of light emitting units.

Figure 12:
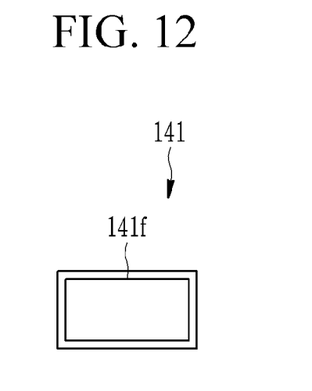
FIGS. 12 and 13 are diagrams illustrating an example in which the light output unit of the address direction guiding apparatus guides an address direction according to still another aspect of the exemplary embodiment.
Figure 13:
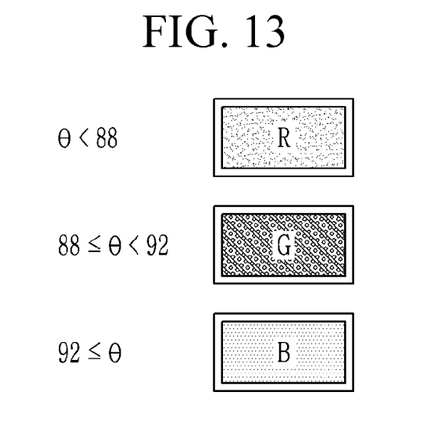

As illustrated in FIG. 12, the light output unit 141 includes a light emitting unit 141f which emits light different colors R, G and B of light. In this case, as illustrated in FIG. 13, the control unit 170 may control the light emitting unit 141f to emit light in red R when the angle between the two directions is less than 88 degrees, control the light emitting unit 141f to emit light in green G when the angle is equal to or more than 88 degrees and less than 92 degrees, and control the light emitting unit 141f to light emit light in blue B when the angle is equal to or more than 92 degrees.

The light output unit 141 may include one light emitting unit to display one color. In this case, the control unit 170 may display the information on the alignment of the user by differently setting the light emission cycle of one color. For example, the control unit 170 may set the light emission cycle of the light emitting unit to a first time and a second time larger than the first time. When the angle between the two directions is less than 88 degrees, the control unit 170 may set the light emission cycle of the light emitting unit to the first time, such that the light emitting unit rapidly flickers. When the angle between the two directions is equal to or more than 92 degrees, the control unit 170 may set the light emission cycle of the light emitting unit to the second time, such that the light emitting unit slowly flickers. When the angle between the two directions is equal to or more than 88 degrees and less than 92 degrees, the control unit 170 may control the light emitting unit not to flicker. As such, the control unit 170 may control the light output unit 141 such that the light emitting unit emits light in different light emission cycles, depending on the alignment of the user.

Through this operation, the user can conveniently grasp the angle between the target direction and the direction that the user faces, based on the color and the light emission cycle of the light output unit 141.

In addition, the address direction guiding apparatus 100 may output information on the alignment of the user by vibrating the vibration output unit 142 in different vibration cycles.

For example, the vibration output unit 142 may set the vibration cycle to a first time or a second time larger than the first time. When the angle between the two directions is equal to or more than 92 degrees, the control unit 170 may set the vibration cycle to the first time, such that the vibration output unit 142 is vibrated at a fast tempo. When the angle between the two directions is equal to or more than 92 degrees, the control unit 170 may set the vibration cycle to the second time, such that the vibration output unit 142 is vibrated at a slow tempo. When the angle between the two directions is equal to or more than 88 degrees and less than 92 degrees, the control unit 170 may control the vibration output unit 142 to continuously vibrate.

Through this operation, the user may conveniently grasp the angle between the target direction and the direction that the user faces, through the vibration of the vibration output unit 142.

Since the address direction guiding apparatuses 100 according to the exemplary embodiments use the light emitting units having excellent visibility and color contrast, the sensitivity to the focal distance is so low that the user can conveniently use the address direction guiding apparatuses 100 without performing a separate fine adjustment due to the focal distance or a separate fine adjustment when wearing. Furthermore, since an LED device included in the light emitting unit has a low price and a small weight and size, the degree of freedom in wearing position of the address direction guiding apparatus 100 including the LED device is very high.

Next, the address direction guiding apparatus 100 may communicate with another wireless communication device through the short-range communication module 160. The address direction guiding apparatus 100 may receive data processed by the wireless communication device, and use the received data.

This operation will be described with reference to FIGS. 14 and 15.

Figure 14:
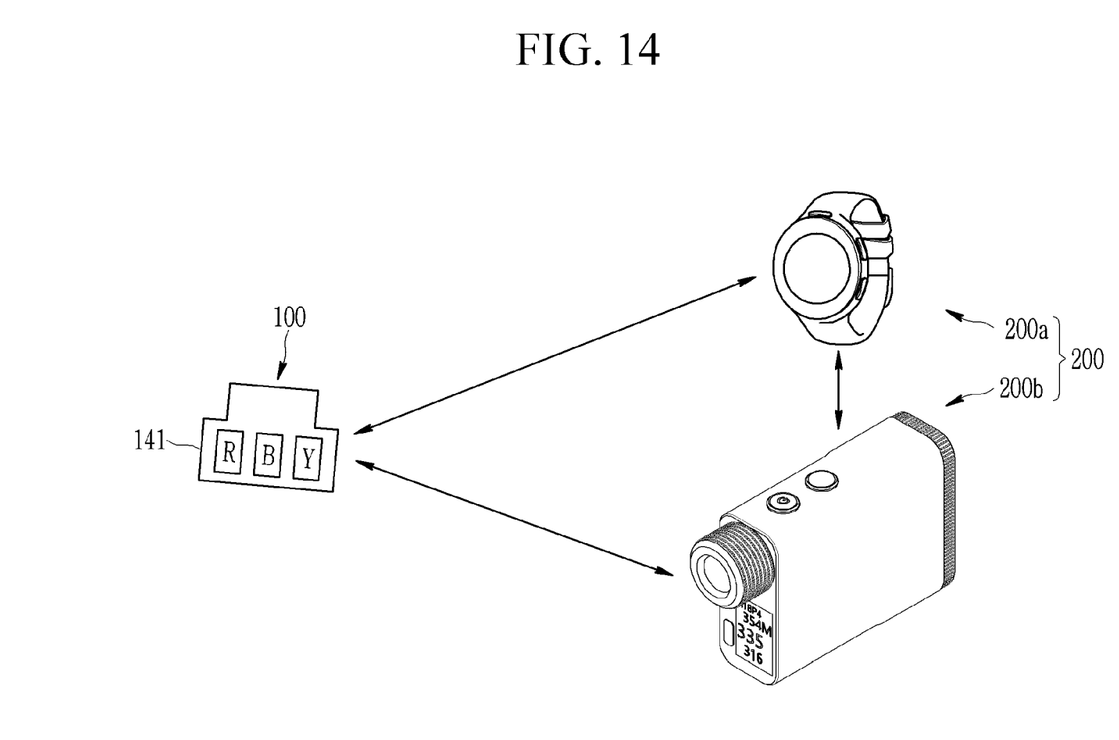
FIG. 14 is a diagram schematically illustrating connection relationships between an address direction guiding apparatus according to another exemplary embodiment and other devices.
Figure 15:
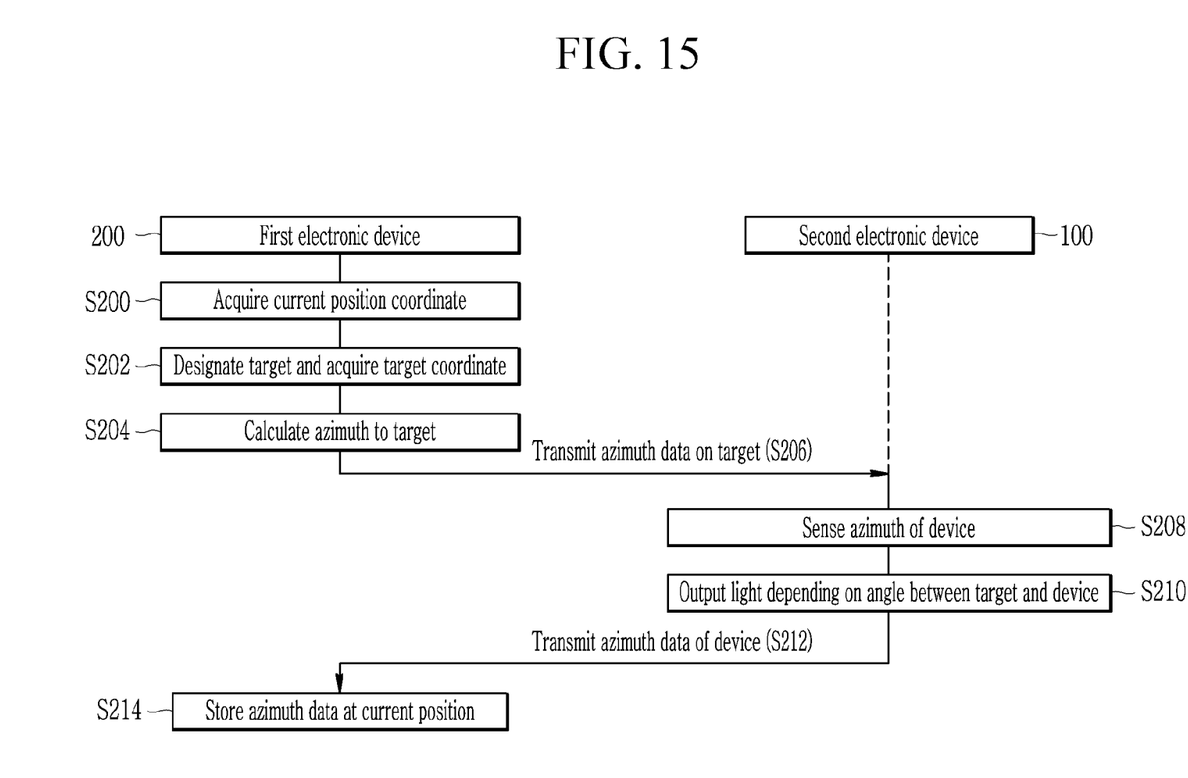
FIG. 15 is a flowchart illustrating an address direction guiding method according to another exemplary embodiment.

FIG. 14 is a diagram schematically illustrating connection relationships between an address direction guiding apparatus according to another exemplary embodiment and other devices, and FIG. 15 is a flowchart illustrating an address direction guiding method according to another embodiment.

As illustrated in FIG. 14, the address direction guiding apparatus 100 may be connected to another electronic device 200 through short-range communication. For example, the address direction guiding apparatus 100 may be connected to a smart watch 200a through Bluetooth. Furthermore, the address direction guiding apparatus 100 may be connected to a distance measurement device 200b through Bluetooth.

The electronic device 200 may include a sensing unit, a user input unit, an interface unit, an output unit, a memory, a wireless communication unit, a control unit, a power supply unit and the like. The sensing unit senses one or more pieces of information between surrounding environment information of the electronic device 800 and information within the electronic device 800, and the memory stores course map information.

In particular, the distance measurement device 200b may further include a distance measurement sensor to measure a distance to a target. The distance measurement device 200b may calculate the position coordinate of the target through such a distance measurement sensor.

The address direction guiding apparatus 100 may receive information from the electronic device 200. For example, the address direction guiding apparatus 100 may receive course map information from the electronic device 200, the course map information including map image information of the course, accumulative information of map images, and position coordinate information corresponding to reference points of the map images. Furthermore, the address direction guiding apparatus 100 may receive the current position coordinate, the target coordinate, and information on the direction from the current position to the target (for example, information such as azimuth) from the electronic device 200.

Referring to FIG. 15, the address direction guiding method of the address direction guiding apparatus 100 and the electronic device 200 will be described. Hereafter, the address direction guiding apparatus 100 will be described as a second electronic device 100, and the electronic device 200 will be described as a first electronic device 200.

First, the first electronic device 200 acquires the current position (S200).

The first electronic device 200 acquires a target coordinate when a target is designated (S202). For example, when the first electronic device 200 is the distance measurement device 200b, the first electronic device 200 may acquire the position coordinate of the target designated by the distance measurement sensor. Alternatively, the first electronic device 200 may read the coordinate of a predetermined target from the memory having the course map information stored therein.

Then, the first electronic device 200 calculates an azimuth using the current position coordinate and the position coordinate of the target (S204).

The first electronic device 200 transmits the azimuth data on the target to the second electronic device 100 (S206).

The second electronic device 100 senses the azimuth of the direction that the second device 100 faces (S208). Then, the second electronic device 100 controls a light output of the light output unit according to the angle between the target direction and the direction that the second electronic device 100 faces (S210).

Then, the second electronic device 100 transmits the azimuth data to the first electronic device 200 (S212), the azimuth data being related to the direction that the second electronic device 100 faces. That is, the second electronic device 100 may transmit information on the address direction of the user to the first electronic device 200.

Then, the first electronic device 200 associates the azimuth data with the current position coordinate, and stores the azimuth data in the memory (S214), the azimuth data being related to the direction that the second electronic device 100 faces.

According to the address direction guiding method, the address direction guiding apparatus 100 can guide the address direction using the data measured by the position acquisition sensor and the distance measurement sensor of the electronic device 200 and the data read from the memory. Therefore, the address direction guiding apparatus 100 may not include the position acquisition sensor, the distance measurement sensor and the memory, which makes it possible to reduce the weight and size of the address direction guiding apparatus 100.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An address direction guiding apparatus comprising:
   an azimuth sensor configured to measure an azimuth;
   a light output unit configured to output light;
   a memory configured to store map information of golf courses;
   a position acquisition sensor configured to acquire a current position; and
   a control unit configured to control the light output unit to output light differently depending on an angle between a target azimuth and the azimuth measured by the azimuth sensor,
   wherein the control unit reads map information of a golf course corresponding to the current position from the memory, acquires the coordinate of a predetermined target using the map information, and calculates the target azimuth using the coordinate of the current position and the coordinate of the target.

2. The address direction guiding apparatus of claim 1, wherein:
the light output unit comprises a plurality of light emitting units configured to emit different colors of light, and
the control unit controls the light output unit such that at least one of the plurality of light emitting units emits light to display different colors of light depending on the angle.

3. The address direction guiding apparatus of claim 1, wherein:
the light output unit comprises one light emitting unit configured to emit different colors of light, and
the control unit controls the light output unit such that the light emitting unit emits light to display different colors of light depending on the angle.

4. The address direction guiding apparatus of claim 1, wherein:
the light output unit comprises one light emitting unit configured to emit one color of light, and
the control unit controls the light output unit such that the light emitting unit emits light in different light emission cycles depending on the angle.

5. The address direction guiding apparatus of claim 1, further comprising:
a user input unit,
wherein the control unit sets an azimuth to the target azimuth, the azimuth being measured by the azimuth sensor when the user input unit receives a user input.

6. The address direction guiding apparatus of claim 1, further comprising:
a short-range communication module,
wherein the control unit receives information on the target azimuth from another device connected through the short-range communication module.

7. An address direction guiding apparatus comprising:
an azimuth sensor configured to measure an azimuth;
a light output unit configured to output light;
a vibration output unit; and
a control unit configured to control the light output unit to output light differently depending on an angle between a target azimuth and the azimuth measured by the azimuth sensor and control the vibration output unit to vibrate in different vibration cycles depending on the angle.

8. An address direction guiding method comprising:
acquiring a target azimuth;
measuring, by an azimuth sensor, a current azimuth, and
controlling, by a control unit, a light output unit to output light differently depending on an angle between the target azimuth and the azimuth measured by the azimuth sensor,
wherein:
the acquiring of the target azimuth comprises:
acquiring, by a position acquisition sensor, a current position;
reading, by the control unit, map information of a golf course corresponding to the current position from a memory storing map information of golf courses;
acquiring, by the control unit, the coordinate of a predetermined target using the map information; and
calculating, by the control unit, the target azimuth using the coordinate of the current position and the coordinate of the target.

9. The address direction guiding method of claim 8, wherein:
the controlling of the light output unit to output light differently comprises
controlling, by the control unit, the light output unit such that at least one of a plurality of light emitting units to emit different colors of light emits light to display different colors of light depending on the angle.

10. The address direction guiding method of claim 8, wherein:
the controlling of the light output unit to output light differently comprises
controlling, by the control unit, the light output unit such that one light emitting unit to emit different colors of light emits light to display different colors of light depending on the angle.

11. The address direction guiding method of claim 8, wherein:
the controlling of the light output unit to output light differently comprises
controlling, by the control unit, the light output unit such that one light emitting unit to emit one color of light emits light in different light emission cycles depending on the angle.

12. The address direction guiding method of claim 8, wherein:
the acquiring of the target azimuth comprises:
receiving, by a user input unit, a user input;
controlling, by the control unit, the azimuth sensor to measure an azimuth when the user input is received; and
setting, by the control unit, an azimuth to the target azimuth, the azimuth being measured when the user input is received.

13. The address direction guiding method of claim 8, wherein:
the acquiring of the target azimuth comprises
receiving, by the control unit, information on the target azimuth from another device connected through a short-range communication module.

14. An address direction guiding method comprising:
acquiring a target azimuth;
measuring, by an azimuth sensor, a current azimuth;
controlling, by a control unit, a light output unit to output light differently depending on an angle between the target azimuth and the azimuth measured by the azimuth sensor; and
controlling, by the control unit, a vibration output unit to vibrate in different vibration cycles depending on the angle.

* * * * *